United States Patent

[11] 3,582,760

[72] Inventor Cheng Sun
East Brunswick, N.J.
[21] Appl. No. 004,331
[22] Filed Jan. 20, 1970
[45] Patented June 1, 1971
[73] Assignee RCA Corporation
Continuation of application Ser. No. 645,915, June 14, 1967, now abandoned. This application Jan. 20, 1970, Ser. No. 004,331

[54] FREQUENCY MULTIPLIER
9 Claims, 3 Drawing Figs.

[52] U.S. Cl. .......... 321/69, 330/4.9, 333/80, 333/84
[51] Int. Cl. .......... H02m 5/30, H02m 5/20
[50] Field of Search .......... 325/153; 328/16; 330/4.9, 5; 331/76; 333/76, 80 (T), 80 (M); 307/320; 321/69 (NL), 69 (W)

[56] References Cited
UNITED STATES PATENTS

| | | | |
|---|---|---|---|
| 3,267,352 | 8/1966 | Blight .......... | 321/69 |
| 3,334,294 | 8/1967 | Lindberg .......... | 321/69 |

OTHER REFERENCES
" Microstrip Plus Equations Adds Up to Fast Designs" by A. Schwarzmann, Electronics Oct. 2, 1967, pgs. 109— 112 Relied Upon Copy in 321- 69 N.L.

*Primary Examiner*—J. D. Miller
*Assistant Examiner*—Gerald Goldberg
*Attorney*—Edward J. Norton

ABSTRACT: A frequency multiplier which employs a pair of varactor diodes driven 180° out of phase in a particular transverse electromagnetic wave (TEM) transmission line arrangement in a manner to provide high-power, high-efficiency operation at frequencies above 1.0 gigahertz (GHz.).

INVENTOR
CHENG SUN
BY Edward J. Norton
ATTORNEY

FREQUENCY MULTIPLIER

This is a continuation of my earlier copending application, Ser. No. 645,915, filed June 14, 1967, now abandoned.

BACKGROUND OF INVENTION

The invention herein described was made in the course of a contract or subcontract thereunder with the Department of the Air Force.

While the prior art shows many frequency multiplier circuits for different bands of frequencies, there remains a need for frequency multipliers which are capable of operating above a thousand megahertz (MHz). Such circuits have to be capable of producing high power and operate with high efficiency. When frequencies of this order are approached, the circuit designer finds himself in a hybrid state. That is, lumped components such as transformers and various other elements have extreme losses, while microwave elements such as waveguides, and so on, are too bulky and difficult to use. Because of the increased use of frequencies within this band and because of the increasing need for circuitry which is compatible with integrated circuit techniques, a need exists for an efficient, compact, high frequency multiplier.

It is therefore an object of the present invention to provide an improved frequency multiplier operating at frequencies above 1000 MHz.

A further object is to provide an improved frequency multiplier which is compatible with integrated circuits.

These and other objects are accomplished in one embodiment of the present invention by employing a first metallic bar or strip of a length between one-eighth and one-sixth of a wavelength at the input frequency which is to be multiplied. The bar is placed above a ground-plane-supporting structure. A variable reactance device, for example, a varactor diode having an anode and a cathode terminal is coupled to one end of the bar at the anode terminal, the cathode being returned to a point of reference potential. A second varactor diode possessing the same voltage-capacity characteristics as the first is coupled to the other end of the bar in a similar manner. A second metallic bar of the same length is positioned lengthwise to and parallel with the first bar. The second bar is spaced from the first bar a distance to cause the two bars with the ground plane to form a coupled TEM structure. Tunable capacitor elements are coupled to the respective bars which serve to affect the effective lengths of these bars and further cause the transverse electromagnetic wave to pump the two varactors in a manner to drive them 180° out of phase. The variable reactance diodes provide equal power which is combined in a manner to obtain an output signal at the multiplied frequency which is substantially the sum of the power generated by each device. Because the metallic bars in conjunction with their coupling capacitors are dimensioned in length at fractions less than a quarter of a wavelength and because of the frequencies involved, the final circuit is quite small. Furthermore, due to the mode employed, the diodes can be pumped in the manner described and, hence, produce high power with increased efficiency in a relatively small volume.

DETAILED DESCRIPTION

Figure 1:
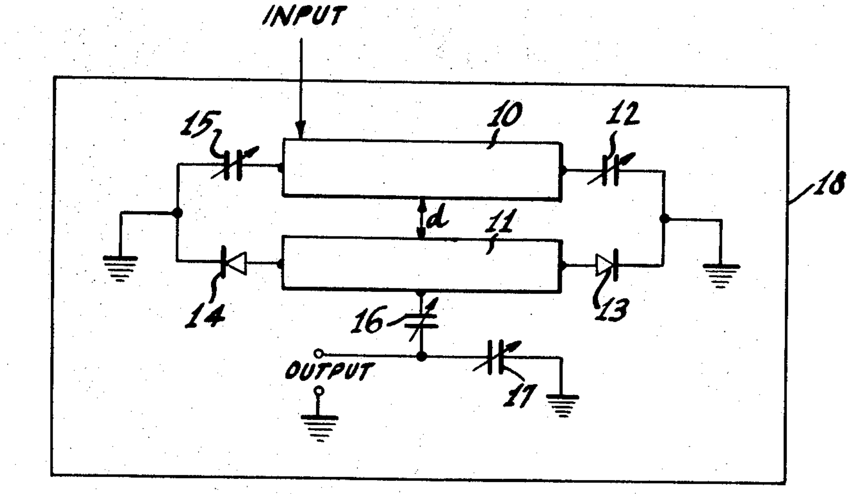
FIG. 1 is a schematic diagram of a frequency doubler according to this invention.

If reference is made to FIG. 1, there is shown a metallic bar or strip 10 which may be fabricated from copper, brass or some other suitable conducting material. At one end of the bar 10, there is coupled a variable tuning capacitor 12 whose other terminal is returned to a point of reference potential such as ground. At the left or opposite end of the bar 10 another tuning capacitor 15 is connected between this end of the bar 10 and ground. The bar 10 as well as the capacitors 12 and 15 are mounted on a ceramic or other suitable substrate 18 of the type normally used in integrated circuit assemblies. For the present applications, the substrate 18 may be a laminated structure which comprises a layer of conductive material, for example, copper, upon the surface of which is coated a ceramic substrate or some other type of suitable insulating material, thereby, forming a ground plane. In this case, the bar 10 can be deposited or mounted on the ceramic substrate of the layered ground plane 18. Shown lengthwise to and parallel with the bar 10 and separated by a distance $d$ is a second bar 11. The second bar 11 is of the same length as bar 10 and is fabricated from a similar material. Coupled to the right end of the bar 11 is the anode of a variable reactance diode or varactor 13. The cathode of diode 13 is returned to a source of reference potential. Shown coupled to the other end of the bar 11 is the anode of another variable reactance diode 14, the cathode of which is also returned to a point of reference potential. Coupled at the center of bar 11 is one terminal of a variable capacitor 16 whose other terminal is connected to a terminal of a variable capacitor 17. The other terminal of capacitor 17 is returned to a point of reference potential or ground. The varactor diodes 13 and 14 utilized in combination with the bar 11 are substantially matched in that they exhibit substantially identical power law characteristics. The diodes 13 and 14 should preferably have a capacitance vs. voltage law which is nearly equal to zero.

The circuit shown in FIG. 1 operates as follows. An input signal represented by the arrow on the left, above bar 10, is coupled to the bar 10 by suitable means which may be a capacitor or a matching network serving to match the input signal generator's impedance to that of the bar 10. The bar 10 is dimensioned at the frequency of the input signal such that its length is equal to one-sixth to one-eighth of a wavelength. In practice, it has been found that the bar 10 can be dimensioned at one-eighth of a wavelength and the circuit will perform satisfactorily. The capacitor 12 is tunable so that the input impedance of the bar or line 10 can be adjusted without changing the even and odd impedance characteristics of the composite structure. The line or bar 11 is separated from the bar 10 by a distance $d$ chosen to cause the configuration in conjunction with ground plane 18 to form a coupled transverse electromagnetic-wave-supporting structure or TEM-wave-supporting device at the input signal's frequency. The presence of the input signal's power supplied to bar 10 drives the varactor diodes 13 and 14 at the signal's fundamental frequency 180° out of phase and at equal amplitude. Therefore, the diodes 13 and 14 share the input power equally. Since the two diodes are driven by the fundamental current 180° out of phase, the power produced by the diodes at the second harmonic will be equal magnitude and in phase. Thus, the output power can be taken out symmetrically at the center of line 11 using the capacitive matching network, comprising tunable capacitors 16 and 17. The tunable capacitor network of capacitors 16 and 17 is used mainly to adjust the output impedance of the multiplier so that it efficiently couples to a load. Analysis of this push-pull varactor doubler circuit shows that using the shorter input bar (less than one-quarter of a wavelength long) gives a flatter power output versus tuning capability. Both theory and experiment show that the circuit described is free of instability caused by interaction between the diodes which instability is a problem in prior art frequency multipliers.

Figures 2, 3:
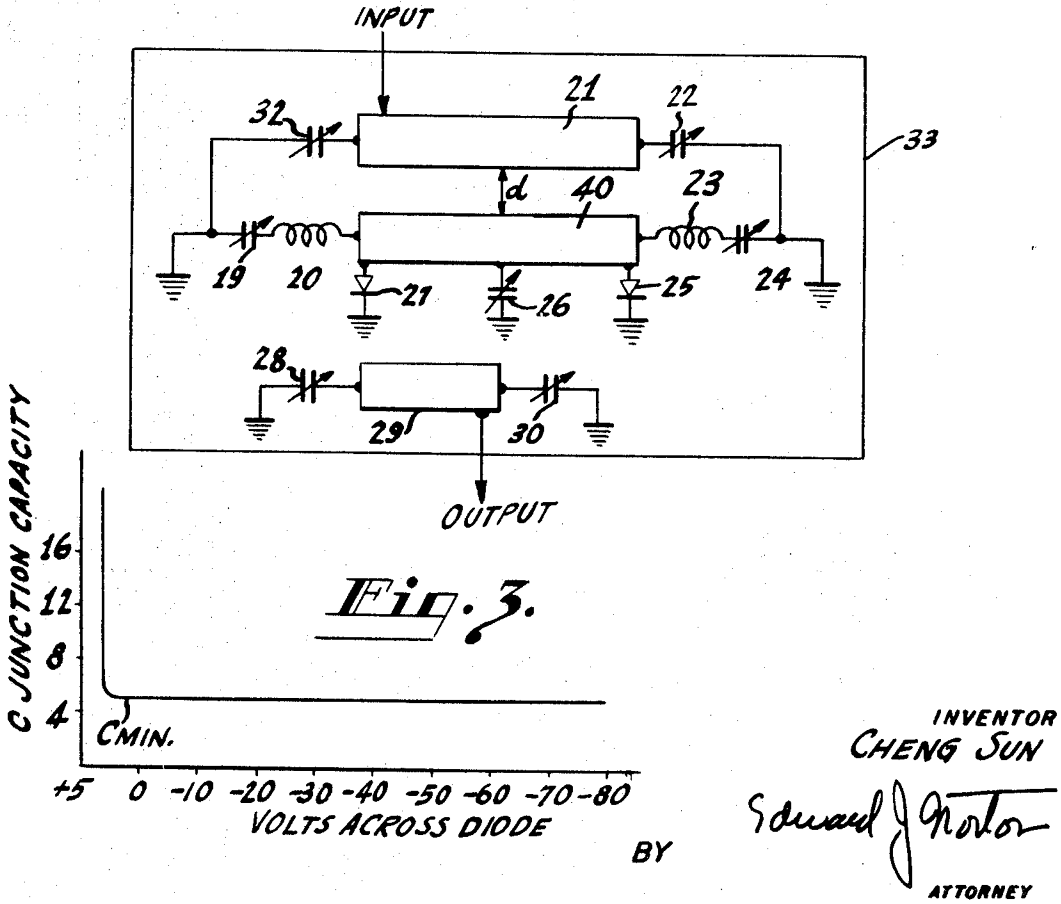
FIG. 2 is a schematic diagram of an integer multiplier or one capable of multiplying the frequency of an input signal by integers greater than one.
FIG. 3 is a graph showing the junction capacity versus voltage for variable reactance devices which may be employed in this invention.

If reference is made to FIG. 2, there is shown a frequency multiplier circuit which uses a shortened input line and which is capable of tripling or quadrupling an input frequency. There is shown a bar 21 whose length is between one-eighth and one-sixth of a wavelength at the input frequency. Coupled between one end of bar 21 and ground or point of reference potential is a variable capacitor 22. Coupled between the other end of bar 21 and ground is another tunable capacitor 32. Separated from bar 21 by a distance *d* is a second bar 40 of the same length as bar 21 and fabricated from a material as described in conjunction with bars 10 and 11 of FIG. 1. Idling circuits are coupled at the respective ends of bar 40. The right hand of bar 40 is coupled to one terminal of a coil or inductor 23 whose other terminal is coupled to a variable capacitor 24, the inductor 23 and capacitor 24 comprising one idler circuit. The other terminal of capacitor 24 is returned to a point of reference potential or ground. Also coupled at this end of bar 40 is the anode of a variable reactance diode 25 whose cathode is returned to a point of reference potential. The other end of the bar 40 is returned to a point of reference potential through the series idler path comprising inductor 20 and variable capacitor 19. This end of bar 40 is also coupled to the anode of a varactor diode 27 whose cathode is returned to a point of reference potential. At the center of bar 40 there is coupled one terminal of a variable capacitor 26 whose other terminal is returned to ground. Also shown lengthwise to and separated from bar 40 is a third bar 29 whose length is dimensioned between one-sixth to one-eighth of a wavelength of the multiplied frequency. Bar 29 is returned to ground at both ends through respective tuning capacitors 28 and 30 coupled at these ends.

The input circuit or signal is coupled to the varactor diodes in a transverse electromagnetic mode. The propagation of the mode for efficient matching and coupling is accomplished by setting capacitors 22 and 32 at suitable values which settings are made for maximum power output. Because the length of the coupled TEM lines or bars 21 and 40 is chosen as described above, the driving currents at the fundamental frequency or input frequency through the two diodes 25 and 27 are 180° out of phase and of equal amplitude. If the diodes are substantially matched they will share the input power equally. Due to the nonlinear reactance characteristics of such devices they will produce harmonics of the input signal. The two separate idler circuits respectively comprising inductor 23 and capacitor 24 at one end and inductor 20 and capacitor 19 at the other end of the bar 40 are chosen such that second harmonic current generated by the diodes can pass through each diode respectively. This second harmonic current adds to the fundamental frequency current to enhance the third harmonic or tripled frequency in the case of a tripler. For use as a quadrupler, the second harmonic will enhance second harmonic components produced by the diodes to enable the quadrupler frequency to be coupled from the line 40. Capacitor 26 at the center of line 40 is tuned to be resonant with the line 40 at the proper output-multiplied frequency depending upon whether tripler or quadrupler action is desired. The output power is coupled to a load by means of the coupled line 29 whose length is chosen to be between one-eighth to one-sixth of a wavelength at the desired output frequency. However, where simultaneous action as a tripler or quadrupler is desired in one circuit, line 29 can be dimensioned to have a length of one-half the length of bars 40 and 41. Since at least two diodes are used in these circuits and *since they produce power which is substantially in phase* the effective power at the output is doubled as compared to that obtained by the use of a single diode. In a like manner as described above the circuit of FIG. 2 can be mounted in a suitable substrate as 33.

If reference is made to FIG. 3 there is shown the desired junction-capacity-versus-voltage curve for the diodes used in FIGS. 1 and 2. The power handling capacity of a diode is primarily determined by three factors, namely: its breakdown voltage, its minimum capacity, and its junction-capacity-versus-voltage variation. If the diodes chosen follow a capacitance vs. voltage law approximately equal to zero and if a suitable drive level is applied thereto, a diode with a breakdown voltage of about 80 v. and a minimum junction capacity of about 5.5 picofarads (shown as $C_{min.}$ in FIG. 3) will produce an output power of approximately 14½ watts at an output frequency in excess of 2 GHz. Circuits designed in accordance with the above description have handled input powers of 60 watts and produced multiplied outputs in the 1 to 2 GHz. range with superior efficiency. Bar-type frequency doubler circuits using such varactors in a TEM coupled mode will produce 31 watts at 1.04 GHz. with 61 percent efficiency, 24 watts at 2.08 GHz. with 52 percent efficiency and 10 watts at 3.9 GHz. Because of the substantial shortening of both the input and output lines, the circuits can be used with integrated components producing small compact packages capable of improved operation.

What I claim is:

1. Apparatus for multiplying the frequency of an input signal by an integer greater than one comprising, a. a first metallic bar of a length between one-eighth and one-sixth of a wavelength at said input signal's frequency, b. a second metallic bar of a length between one-eighth and one-sixth of a wavelength at said input signal's frequency and spaced a given distance from said first bar, c. means including tuning capacitors for coupling said first and second bars in a configuration capable of supporting coupled transverse electromagnetic modes at said input signal's frequency, and d. at least two variable reactance devices coupled to said second metallic bar and responsive to said transverse electromagnetic mode of said input signal to produce substantially equal power signals 180° out of phase with respect to one another at an integer-multiplied frequency.

2. The apparatus in accordance with claim 1 wherein a. the variable reactance devices are varactor diodes each having a constant junction capacity characteristic from zero volts across their junction to at least negative 60 volts.

3. A multiplier for increasing the frequency by an integer greater than one of an input signal, comprising:

a. first and second variable reactance devices each having two terminals, b. a substrate of dielectric material having a relatively wide planar conductor on one surface of the substrate, c. a first metallic bar positioned on a second surface of said substrate opposite said one surface and coupled at one end to one terminal of said first variable reactance device and at its other end to one terminal of said second variable reactance device, d. means for coupling the other terminal of said variable reactance devices to a point of reference potential, e. a second metallic bar responsive to said input signal positioned lengthwise to said first bar and on said second surface of said substrate and separated from said first bar at a distance to cause said first and second bars in conjunction with said wider planar conductor to form a coupled transverse electromagnetic mode electromagnetic wave supporting structure at said input signal frequency, and f. tuning means coupled to said first and second bars responsive to said electromagnetic wave at said input signal frequency to cause said variable reactance devices to produce a constant power output at a multiplied integer of said input signal frequency.

4. Apparatus for multiplying the frequency of an input signal comprising:

a. a first metallic bar and a wider planar conductor, said first bar spaced from said wider planar conductor and having a length between one-eighth and one-sixth of a wavelength at said input signal frequency, b. tuning means coupled at each end of said first bar for providing with said first bar a resonant circuit at said input signal frequency, c. a second metallic bar spaced from said wider planar conductor and having a length between one-eighth and one-sixth of a wavelength at said input signal frequency, said second bar positioned with respect to said first bar to form a transverse electromagnetic mode electromagnetic wave coupling structure at said input signal frequency, d. first and second varactor diodes each having an anode and cathode, the anode of said first diode coupled to one end of said second bar and the anode of said second diode coupled to the other end of said second bar, e. means for coupling said cathodes of said first and second varactor diodes to a point of reference potential, f. tuning means coupled to said second bar for providing a resonant circuit with said second bar at the multiplied frequency, said tuning means including at least one capacitor coupled to the center of said second bar for providing a constant output power at said multiplied frequency.

5. Apparatus for multiplying the frequency of an input signal by an integer greater than one, comprising:

first and second varactor diodes each having a cathode and anode terminal, a relatively wide planar conductor, a first metallic bar spaced from said relatively wide planar conductor and dimensioned in length between one-eighth and one-sixth of a wavelength at said frequency of said input signal, said first bar coupled at one end to the anode of said first varactor diode and at its other end to the anode of said second varactor diode, means for coupling the cathodes of said varactor diodes to a point of reference potential, a second metallic bar spaced from said relatively wide planar conductor and dimensioned in length between one-eighth and one-sixth of a wavelength at said frequency of said input signal, said second bar positioned with respect to said first bar to provide in combination therewith a transverse electromagnetic mode electromagnetic wave coupling structure at said frequency of said input signal, means coupled to said second bar responsive to said input signal to split the power of said signal in a manner to provide equal and opposite currents to said varactor diodes coupled to said first bar, causing each of them to generate multiplied frequency power, and means coupled to the center of said first bar responsive to said multiplied frequency power to provide a constant power output at said center which is substantially equal to the sum of said multiplied frequency power generated by each varactor diode.

6. Apparatus for multiplying the frequency of an input signal by an integer greater than one, comprising:

a. a ceramic substrate having a layer of conductive material on one surface of said ceramic substrate, b. a first metallic bar positioned on said ceramic substrate and spaced from said layer of conductive material and dimensioned between one-eighth and one-sixth of a wavelength at said frequency of said input signal, c. a second metallic bar positioned on said ceramic substrate so as to be spaced from said layer of conductive material and dimensioned between one-eighth and one-sixth of a wavelength at said frequency of said input signal, said second bar positioned longitudinal to said first bar and spaced from said first bar to form with said first bar a coupled transverse electromagnetic wave supporting structure at the input signal frequency and multiplied frequencies, d. first and second variable reactance diodes each having an anode and cathode, the anode of said first diode coupled to one end of said first bar and the anode of said second diode coupled to the opposite end of said first bar, e. means for coupling said cathodes to a point of reference potential, f. means coupled to said second bar responsive to said frequency of said input signal to cause said reactance diodes to produce equal power at said multiplied frequency, and g. means coupled to said first bar responsive to said power produced by each diode to combine said power in a transverse electromagnetic mode, whereby the combined power obtained is substantially the sum of that produced by each diode.

7. The apparatus in accordance with claim 6 wherein the means coupled to said first bar additionally includes:

a. a third bar longitudinal to said first and second bars mounted on the ceramic substrate, said third bar spaced from said layer of conductive material and dimensioned between one-eighth and one-sixth of a wavelength long at said multiplied frequency.

8. Apparatus for doubling the frequency of an input signal, comprising:

a. a first metallic bar of a length substantially equal to one-eighth of a wavelength at said input signal frequency spaced from a wider planar conductor, b. a first tunable capacitor connected between one end of said first bar and a point of reference potential, c. a second tunable capacitor connected between said other end of said first bar and said point of reference potential, d. a second metallic bar dimensioned to support said doubled frequency, longitudinal to said first bar and separated from said first bar and said wider planar conductor at a distance to form a coupled electromagnetic wave supporting structure therewith, e. a first varactor diode connected between one end of said second metallic bar and a point of reference potential, f. a second varactor diode connected between the opposite end of said second bar and a point of reference potential, g. a third tunable capacitor having two terminals with one terminal coupled to the center of said second bar, h. a fourth tunable capacitor having a pair of terminals with one terminal connected to the other terminal of said third capacitor and the other terminal of the fourth capacitor coupled to a point of reference potential, i. means for exciting said first bar at said first-mentioned frequency to cause said diodes to generate power at said doubled frequency at said junction of said third and fourth tunable capacitors.

9. A multiplier for increasing the frequency by an integer greater than one of an input signal, comprising:

a. first and second variable reactance devices each having two terminals;

b. a first metallic bar and a wider planar conductor, said first bar spaced from said wider planar conductor and coupled at one end to one terminal of said first variable reactance device and at its other end to one terminal of said second variable reactance device;

c. means for coupling the other terminal of said variable reactance devices to a point of reference potential;

d. a second metallic bar responsive to said input signal, positioned lengthwise to said first bar, spaced from said wider planar conductor, and separated from said first bar at a distance to cause said first and second bar in conjunction with said wider planar conductor a coupled electromagnetic wave supporting structure at said input signal frequency; and e. tuning means coupled to said first and second bars responsive to said electromagnetic wave at said input signal frequency to cause said variable reactance devices to produce a constant power output at a multiplied integer of said input signal frequency.